US009622072B2

(12) United States Patent
Wu et al.

(10) Patent No.: US 9,622,072 B2
(45) Date of Patent: Apr. 11, 2017

(54) COMMUNICATION METHOD, METHOD FOR FORWARDING DATA MESSAGE DURING THE COMMUNICATION PROCESS AND COMMUNICATION NODE THEREOF

(75) Inventors: Qiang Wu, Shenzhen (CN); Bing Huang, Shenzhen (CN); Tao Fu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 1309 days.

(21) Appl. No.: 13/394,972

(22) PCT Filed: Sep. 14, 2010

(86) PCT No.: PCT/CN2010/076857
§ 371 (c)(1),
(2), (4) Date: Mar. 8, 2012

(87) PCT Pub. No.: WO2011/032481
PCT Pub. Date: Mar. 24, 2011

(65) Prior Publication Data
US 2012/0176932 A1 Jul. 12, 2012

(30) Foreign Application Priority Data

Sep. 17, 2009 (CN) .......................... 2009 1 0171975
Oct. 16, 2009 (CN) .......................... 2009 1 0205561

(51) Int. Cl.
*H04L 12/741* (2013.01)
*H04W 8/26* (2009.01)
(Continued)

(52) U.S. Cl.
CPC .......... *H04W 8/26* (2013.01); *H04L 61/2084* (2013.01); *H04L 61/103* (2013.01); *H04L 61/6004* (2013.01); *H04W 80/045* (2013.01)

(58) Field of Classification Search
None
See application file for complete search history.

(56) References Cited

U.S. PATENT DOCUMENTS 7,334,049 B1 * 2/2008 Somasundaram ...... H04L 69/22
709/227
2001/0014917 A1 * 8/2001 Ishiyama et al. ............. 709/227
(Continued)

FOREIGN PATENT DOCUMENTS

| CN | 1801764 A | 7/2006 |
|---|---|---|
| CN | 101222414 A | 7/2008 |
| WO | 2004100421 A2 | 11/2004 |

OTHER PUBLICATIONS

Network Working Group, Internet-Draft, Intended status: Experimental, expires, Jul. 31, 2009, Interworking LISP with IPv4 and IPv6, D. Lewis, D. Meyers, D. Farinacci, V. Fuller, Cisco Systems, Inc., Jan. 27, 2009, 16 pages.

(Continued)

*Primary Examiner* — Hassan Phillips
*Assistant Examiner* — Duc Duong
(74) *Attorney, Agent, or Firm* — Banner & Witcoff, Ltd.

(57) ABSTRACT

The present invention provides a communication method, and a method for forwarding a data message during the communication process and a communication node. Wherein, the configuration mode for identity recognition is clarified, and under the architecture based on access identifier and location separation in the network, a specific method for implementing identity recognition is provided, and the processing performed by each network element is regulated; the requirement for the number of the coding spaces is met, meanwhile the present invention realizes the intercommunication and interconnection with the legacy IP network, realizes the compatibility with the upper application programs of IPv4/IPv6, and supports the various appli- (Continued)

cation programs of the IPv4/IPv6 network to transplant smoothly to the architecture based on access identifier and location separation in the network.

26 Claims, 5 Drawing Sheets

(51) Int. Cl.
*H04W 80/04* (2009.01)
*H04L 29/12* (2006.01)

(56) References Cited

U.S. PATENT DOCUMENTS

| | | | |
|---|---|---|---|
| 2003/0065817 A1* | 4/2003 | Benchetrit et al. | 709/245 |
| 2003/0165121 A1* | 9/2003 | Leung | H04L 29/12009 370/313 |
| 2004/0240393 A1* | 12/2004 | Nishida et al. | 370/253 |
| 2007/0276957 A1* | 11/2007 | King et al. | 709/238 |
| 2009/0138295 A1* | 5/2009 | Deitrich et al. | 705/7 |
| 2010/0039992 A1* | 2/2010 | Prakash et al. | 370/328 |
| 2010/0208742 A1* | 8/2010 | Kafle et al. | 370/401 |

OTHER PUBLICATIONS

Network Working Group, Internet-Draft, Intended status: Experimental, Expires Mar. 20, 2010, Locator/ID Separation Protocol (LISP) draft-ietf-lisp-04.txt, D. Farinacci, V. Fuller, D. Meyer, D. Lewis, Cisco Systems, Sep. 16, 2009, 67 pages.
International Search Report for PCT/CN2010/076857 dated Nov. 30, 2010.
Zhang, Jianwei et al, UDP Realization of Terminal Mobility Support Scheme Based on Identifier, Communication Technology, vol. 41, No. 12, Dec. 31, 2008.
An ID/Locator Split Arthitecture of Future Networks, Ved P. Kafle, Hideki Otsuki and Masugi Inoue New Generation Network Research Center, National Institute of Information and Communications Technology, 2009 ITU-T Kaleidoscope Academic Conference (8 pages).
Hierarchical Mapping Information Distribution System for ID/Loc Separation for Scalable Addressing and Routing, Kye-Hwan Lee and Young-Tak Kim, Dept. of Information & Comm. Eng., Graduate School, Yeungnam University, Korea, 2009 IFIP/IEEE Intl. Symposium on Integrated Network Management Workshops (pp. 249-252).
The Internet Protocol Journal, vol. II, No. 1, Mar. 2008, a quarterly Technical Publication for Internet and Intranet Professionals (44 pages).

* cited by examiner

COMMUNICATION METHOD, METHOD FOR FORWARDING DATA MESSAGE DURING THE COMMUNICATION PROCESS AND COMMUNICATION NODE THEREOF

TECHNICAL FIELD

The present invention relates to the field of communication technology, and in particular, to a communication method, a method for forwarding a data message during the communication process and a communication node.

BACKGROUND ART

The IP address has dual functions in TCP/IP (Transmission Control Protocol/Internet Protocol) widely used in the existing Internet, i.e., the IP address serves not only as the location identifier of the host network interface of the communication terminal of the network layer in the network topology, but also as the access identifier of the host network interface of the transmission layer. The case of host mobility was not taken into consideration when the TCP/IP protocol was initially designed. However, as host mobility becomes more and more popular, the defect of semantics overload of this kind of IP address becomes more and more apparent. When the IP address of a host changes, not only the route, but also the access identifier of the communication terminal host changes, which will result in bigger and bigger load of the route, and the change of the host identifier will cause interruption of application and connection. The access identifier and location separation problem is proposed to aim to solve the problems of semantics overload of the IP address, severe load of the route and so on, separate the dual functions of the IP address, realize support for problems including mobility, multi-homeness, dynamic redistribution of IP addresses, reduction of route load, and inter-visit between different network areas in the next generation of internet.

In the prior art, the implementing method based on a network router is one of the solutions about access identifier and location separation.

In the prior art, the format of the host identifier is the IPV4 address, and the access identifier compatible with the upper-layer application can be only in IPV4 format. As the popularity and development of IP application, the IPV4 address space cannot meet the requirement for the number by the service applications any more. In the prior art, some new methods for implementing the access identifier, for example, IPV6 address, user identity recognition in HIP (Host Identity Protocol), are defined. These methods are implemented by increasing the bit length of the identity recognition, and only consider how to expand the number of name and address spaces. When the specific functions, like how to be compatible with the existing IPV4 and IPV6 terminals, how to be compatible with the upper-layer application, transplant of IPV4 and IPV6 service application, are related, all of these need to be implemented by way of upgrading HOST software or modifying the service application programs. The prior art realizes intercommunication with the IPV4 terminal by way of supporting dual stack in the network or the terminal, and does not consider compatibility processing functions in access of the IPV4 terminal, transplant of IPV4 services and other aspects.

SUMMARY OF THE INVENTION

The technical problem to be solved in the present invention is to provide a communication method, a method for forwarding a data message during the communication process and a communication node to meet the requirement for the number of the coding spaces and meanwhile realize intercommunication between an access identifier and location separation network and the legacy IP network.

In order to solve the above problem, the present invention provides a communication method applied to an access identifier and location separation network, comprising:

an access service node establishing, for each accessed terminal, a binding relationship between a first identifier of the terminal and a transmitting-receiving link; and when receiving a data message sent from the terminal on the transmitting-receiving link, if a source address of the data message is a second identifier of the terminal, the access service node converting the source address to the first identifier of the terminal according to the binding relationship and then sending the data message to a backbone network for forwarding.

Preferably, the first identifier is an access identifier of the terminal, and the second identifier is a private network IP address of the terminal.

Preferably, the access identifier of the terminal comprises the private network IP address of the terminal, and prefix/suffix information.

Preferably, the access identifier of the terminal adopts an address coding format of IPV6.

Preferably, the prefix/suffix information is a constant or variable determined based on the access identifier and location separation network.

Preferably, the transmitting-receiving link refers to: a point-to-point connection relationship established by the access service node for the terminal.

Preferably, the point-to-point connection relationship is a General Packet Radio Service Tunneling Protocol (GTP) connection or a point-to-point protocol (PPP) connection.

The present invention further discloses a communication method applied to an access identifier and location separation network, comprises the following steps of:

an access service node establishing and storing, for an accessed terminal, a corresponding relationship between a first identifier and a second identifier of the terminal, and a binding relationship between the first identifier and a transmitting-receiving link;

when receiving a data message whose destination address is the first identifier of the terminal, the access service node converting the first identifier to the second identifier according to the corresponding relationship, and forwarding the converted data message to the terminal through the transmitting-receiving link corresponding to the first identifier according to the binding relationship.

Preferably, the first identifier is an access identifier of the terminal, and the second identifier is a private network IP address of the terminal.

Preferably, the access identifier of the terminal is composed of the private network IP address of the terminal and prefix/suffix information, and the prefix/suffix information is a constant or variable determined based on the access identifier and location separation network, and/or, the access identifier of the terminal adopts an address coding format of IPV6.

Preferably, the transmitting-receiving link refers to a point-to-point connection relationship established by the access service node for the terminal, and the point-to-point connection relationship is a General Packet Radio Service Tunneling Protocol (GTP) connection or a point-to-point protocol (PPP) connection.

The present invention further provides a communication method applied to an access identifier and location separation architecture network, comprises the following steps of:

when an access service node to which a terminal accesses receives a data message sent from a correspondent node to the terminal, the access service node distributing a connection identifier to the correspondent node of the terminal according to an access identifier of the correspondent node in a source address of the data message, and storing a corresponding relationship between the connection identifier and the access identifier of the correspondent node;

when the terminal communicates with the correspondent node through the connection identifier, the access service node to which the terminal accesses obtaining the access identifier of the correspondent node according to the corresponding relationship to determine the correspondent node, and realizing conversion between the access identifier of the correspondent node and the connection identifier.

Preferably, the connection identifier is a public network address or a private network address in a traditional communication network.

Preferably, the access service node distributes the same or different connection identifiers to the correspondent nodes of different accessed terminals.

The present invention further provides a communication method used for intercommunication between an access identifier and location separation network and a legacy IP network, comprising the following steps of:

when receiving a data message sent from the access identifier and location separation network to the legacy IP network, an intercommunication node converting a first identifier of the data message to a corresponding second identifier and then sending the data message to the legacy IP network;

when receiving a data message sent from the legacy IP network to the access identifier and location separation network, the intercommunication node converting the second identifier in the data message to the corresponding first identifier and then sending the data message to the access identifier and location separation network.

Preferably, the first identifier is composed of a private network IP address of a terminal and prefix/suffix information, and the second identifier is a public network IP address.

Preferably, the first identifier is an access identifier of the terminal in the access identifier and location separation network.

The present invention further provides a communication method used for intercommunication between an access identifier and location separation network and a legacy IP network, comprising the following steps of:

when a first terminal in the legacy IP network communicates with a second terminal in the access identifier and location separation network, an intercommunication node distributing to the second terminal a connection identifier identifiable to the first terminal and storing a corresponding relationship between the connection identifier and an access identifier of the second terminal, and when the first terminal communicates with the second terminal through the connection identifier, the intercommunication node obtaining the access identifier of the second terminal according to the corresponding relationship to determine the second terminal and realizing conversion between the access identifier and the connection identifier of the second terminal.

Preferably, the connection identifier is a public network IP address or a private network IP address in the legacy IP network.

Preferably, the access service node distributes the same or different connection identifiers to the second terminals communicating with different first terminals.

The present invention further provides a method for forwarding a data message during a communication process applied to an access identifier and location separation network, comprising the following steps of:

when an access service node to which a terminal accesses receives a data message sent from a correspondent node to the terminal, the access service node distributing a connection identifier to the correspondent node according to an access identifier of the correspondent node in a source address of the data message, and storing a corresponding relationship between the connection identifier and the access identifier of the correspondent node;

the access service node to which the terminal accesses replacing the source address in the data message with the connection identifier and then sending the data message to the terminal;

after receiving the data message in which the source address is the connection identifier, the terminal responding to the correspondent node with a data message using the connection identifier as a destination address;

after receiving the data message with which the terminal responds, the access service node to which the terminal accesses searching for the stored corresponding relationship according to the connection identifier to obtain the access identifier of the correspondent node, and replacing the destination address in the data message with the access identifier of the correspondent node and then forwarding the data message to an access node to which the correspondent node accesses.

The present invention further provides a method for forwarding a data message during a communication process applied to an access identifier and location separation network, comprising the following steps of:

an access service node to which a terminal accesses establishing a point-to-point connection relationship for the terminal, and storing a binding relationship between the point-to-point connection relationship and an access identifier of the terminal;

when the terminal sends a data message to a correspondent node through the point-to-point connection relationship, the access service node to which the terminal accesses replacing a source address in the data message with the access identifier of the terminal according to the binding relationship, and then sending the data message to an access service node where the correspondent node is located;

after receiving the data message, the access service node where the correspondent node is located distributing a connection identifier to the terminal according to the access identifier of the terminal therein, and storing a corresponding relationship between the connection identifier and the access identifier of the terminal; then replacing the source address in the data message with the connection identifier and then sending the data message to the correspondent node;

the correspondent node responding with a data message using the connection identifier as a destination address, and the access service node where the correspondent node is located replacing the destination address in the data message with the access identifier of the terminal according to the stored corresponding relationship and then sending the data message to the access service node where the terminal is located.

Preferably, the access identifier comprises a private network IP address part in a traditional communication network, and prefix/suffix information.

Preferably, the prefix/suffix information is a constant or variable determined based on the access identifier and location separation network.

Preferably, the connection identifier adopts a public network IP address or a private network IP address in the traditional communication network.

Preferably, the access service node distributes the same or different connection identifiers to the correspondent nodes of different accessed terminals.

The present invention further provides a communication method applied to an access identifier and location separation network, comprising the following steps of:

a first access service node establishing a first point-to-point connection relationship and a second point-to-point connection relationship respectively for a first terminal and a second terminal that have accessed, and storing binding relationships between the point-to-point connection relationships and access identifiers of corresponding terminals respectively;

when receiving a data message using the access identifier of the first terminal as a destination address, the first access service node distributing a first connection identifier to an correspondent node of the first terminal according to the access identifier of the correspondent node in a source address in the data message, and storing a corresponding relationship between the first connection identifier and the access identifier of the correspondent node; and when receiving a data message using the access identifier of the second terminal as a destination address, the first access service node distributing a second connection identifier to an correspondent node of the second terminal according to the access identifier of the correspondent node in a source address in the data message, and storing a corresponding relationship between the second connection identifier and the access identifier of the correspondent node;

wherein, the second connection identifier is the same as or different from the first connection identifier.

The present invention further provides a communication node applied to an access identifier and location separation network, comprising an access unit and a message forwarding unit, wherein:

the access unit is configured to establish, for each accessed terminal, a binding relationship between a first identifier of the terminal and a transmitting-receiving link;

the message forwarding unit is configured to, when receiving a data message sent from the terminal on the transmitting-receiving link, if a source address of the data message is a second identifier of the terminal, convert the source address to the first identifier of the terminal according to the binding relationship and then send the data message to a backbone network for forwarding; and, when receiving a data message whose destination address is the first identifier of the terminal, convert the first identifier to the second identifier, and forward the converted data message to the terminal through the transmitting-receiving link corresponding to the first identifier according to the binding relationship.

Preferably, the first identifier is an access identifier of the terminal, and the second identifier is a private network IP address of the terminal, and the access identifier of the terminal is composed of the private network IP address of the terminal, and prefix/suffix information;

the message forwarding unit is configured to implement conversion between the first identifier and the second identifier by removing or adding the prefix/suffix information.

The present invention further provides a communication node applied to an access identifier and location separation network, comprising a connection identifier distributing unit and an address converting unit, wherein:

the connection identifier distributing unit is configured to, when receiving a data message sent from an correspondent node to a terminal, distribute a connection identifier to the correspondent node of the terminal according to an access identifier of the correspondent node in a source address of the data message, and store a corresponding relationship between the connection identifier and the access identifier of the correspondent node;

the address converting unit is configured to replace the source address in the data message sent to the terminal with the connection identifier according to the corresponding relationship and then send the data message to the terminal; and, after receiving the data message using the connection identifier as a destination address from the terminal, replace the destination address in the data message with the access identifier of the correspondent node according to the corresponding relationship and then forward the data message to the correspondent node.

Preferably, the communication node is an access service node in the access identifier and location separation network, or an intercommunication node for achieving intercommunication between the access identifier and location separation network and a legacy IP network.

Preferably, the connection identifier distributing unit is configured to distribute the same or different connection identifiers to the correspondent nodes of different terminals.

The present invention has at least the following beneficial effects over the existing solutions:

the configuration mode for identity recognition is clarified, and under the architecture based on access identifier and location separation in the network, a specific method for implementing identity recognition is provided, and the processing performed by each network element is regulated;

the requirement for the number of the coding spaces is met, meanwhile the present invention realizes the intercommunication and interconnection with the legacy IP network, realizes the compatibility with the upper application programs of IPv4/IPv6, and supports the various application programs of the IPv4/IPv6 network to transplant smoothly to the architecture based on access identifier and location separation in the network.

PREFERRED EMBODIMENTS OF THE INVENTION

The technical scheme of the present invention will be further described in detail below with reference to the drawings and examples.

Based on the proposal of the architecture based on access identifier and location separation in the network, the dual functions of identifier identity and location of an IP address are separated to realize support for problems including mobility, multi-homeness, dynamic redistribution of IP addresses, reduction of route load, and inter-visit between different network areas in the next generation of internet.

The core concept of the architecture based on access identifier and location separation in the network is: there are two types of identifiers in the network, namely, access identifier (AID), and Routing-Location Identifier (RID). An AID is uniquely distributed to each user in the network, and this AID keeps unchanged during the process of movement.

Figure 1:
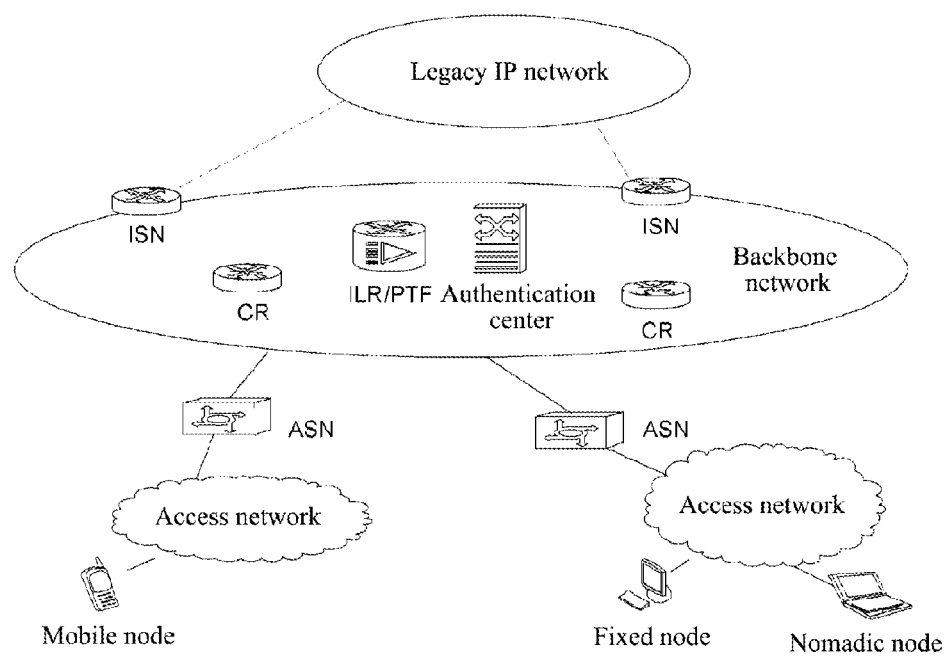
FIG. 1 illustrates the network topology of the architecture based on access identifier and location separation in the network according to an example of the present invention.

In a preferred example of the present invention, the schematic topology of the architecture based on access identifier and location separation in the network is illustrated in FIG. 1. In this architecture, the network is divided into access networks and a backbone network. The access network is located on the edge of the backbone network and is responsible for access of the terminals in the local network. The backbone network is responsible for routing and forwarding data messages of the terminals accessing through the access networks. The Access Service Node (ASN) is located on the boundary point of the backbone network and the access network, and connected with the access network and the backbone network. The access network and the backbone network do not overlap in terms of topology relationship.

Wherein, in a network of the architecture based on access identifier and location separation (also referred to as the present architecture hereinafter), an AID is uniquely distributed to each user terminal, and the AID is used in the access network and keeps unchanged during the movement process of the terminal; RID is a location identifier distributed to the terminal and is used in the backbone network.

Figure 2A:
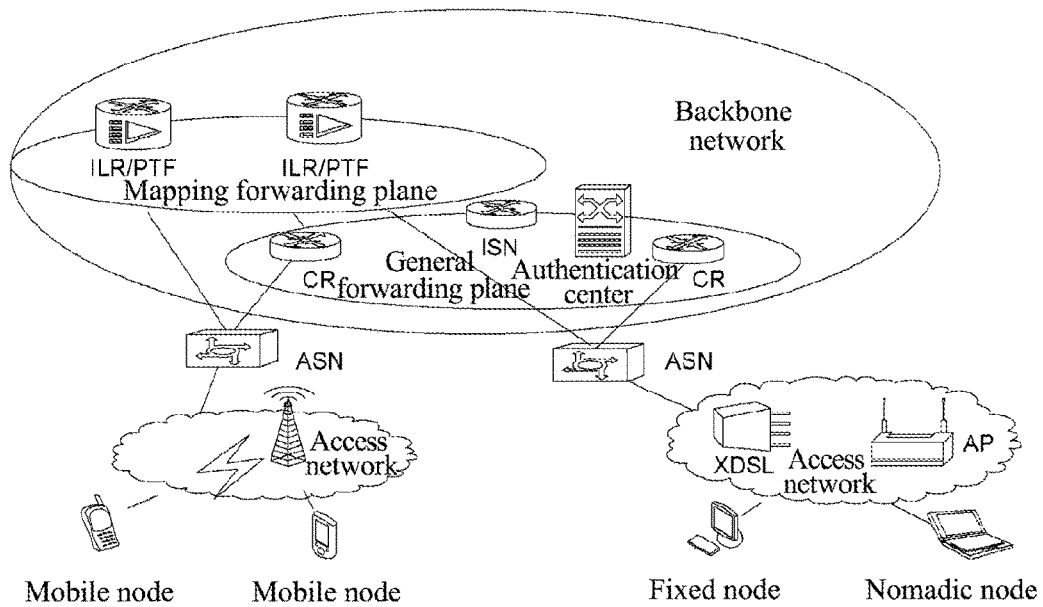
FIG. 2(a) and FIG. 2(b) illustrate the network topologies of the architecture based on access identifier and location separation in the network according to preferred examples of the present invention.
Figure 2B:
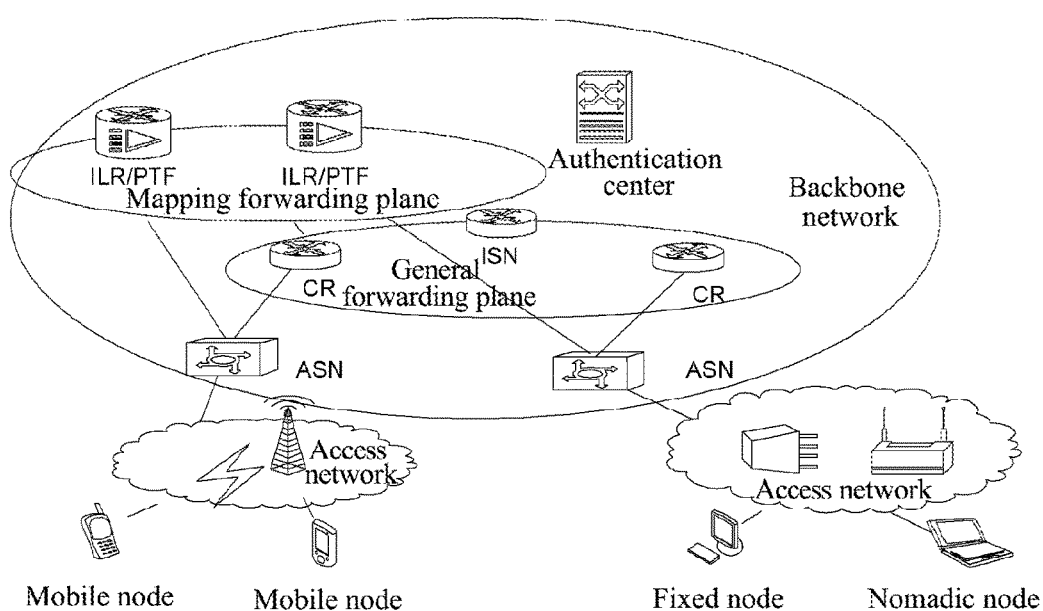

As shown in FIGS. 2(*a*) and 2(*b*), in a preferred example, the backbone network in the present architecture is divided into a mapping forwarding plane and a general forwarding plane.

The general forwarding plane is mainly used to perform routing according to the RID in the data message and forward the data message using the RID as the destination address, and the data routing forwarding action in the general forwarding plane is consistent with that in Legacy IP network. The main network elements in the general forwarding plane include a CR (Common Router) and an ISN (Interconnect Service Node).

The mapping forwarding plane is mainly used to store the identify-location mapping information (i.e., the AID-RID mapping information) of the terminal, process registration and inquiry of the location of the terminal, route and forward the data message taking the AID as the destination address. The main network elements of the mapping forwarding plane include an ILR/PTF (Identity Location Register/Packet Transfer Function).

In FIG. 2(*a*), the ASN is independent from the backbone network in the division of the architecture. In FIG. 2(*b*), the backbone network includes the ASN. FIG. 2(*a*) and FIG. 2(*b*) are only different in division of architecture, and the function implemented by the ASN is the same.

Referring to FIGS. 1, 2(*a*) and 2(*b*), the main network elements and functional entities involved in the architecture based on access identifier and location separation in the network are as follows:

user terminal: in the present architecture, the accessed user terminal may be one or more of a mobile node, a fixed node and a nomadic node.

Access network: it provides a two-layer (physical layer and link layer) access service for the user terminal. The Access network may be a base station system, for example, a BSS (Base Station Subsystem), a RAN (Radio Access Network), an eNodeB (evolved Node B) and so on, or may be an xDSL (Digital Subscriber Line), an AP (Access Point) and so on.

ASN: it maintains the connection relationship between the user terminal and the backbone network, distributes RID to the user terminal, processes switch flow, processes registration flow, implements charging/authentication, maintains/inquires the AID-RID mapping relationship of the correspondent node, encapsulates, routes and forwards the data message sent to or from the terminal.

When the ASN receives a data message sent from the terminal, the ASN inquires a corresponding RID locally according to the AID of the Correspondent Node (CN) in the data message: if a corresponding AID-RID mapping item is found, the data message is forwarded to the backbone network by way of replacing the AID with the RID in the data message, or by encapsulating the RID; if no corresponding AID-RID mapping item is found, an inquiry flow is initiated to the ILR (Identity Location Register) to acquire the AID-RID mapping item, and then the data message is forwarded by way of replacing the AID with the RID in the related data message, or by way of encapsulating the RID; or, the data message is forwarded to the backbone network for route forwarding at the meantime of initiating an inquiry to the ILR, and after the AID-RID mapping relationship returned by the ILR is received, the AID-RID mapping is cached locally;

when receiving a data message sent from the network to the terminal, the ASN sends the data message to the terminal after stripping out the external RID encapsulation.

The ASN is also responsible for acting for an IPV4/IPV6 terminal to achieve compatibility processing between an AID data message of the architecture based on access identifier and location separation in the network and an IPV4/IPV6 data message.

CR (Common Router): it routes and forwards a data message using a RID format as a source address/destination address. The function of this common router is the same as that of the router in the related art.

Authentication center: it is responsible for recording the user attributes including the user type, authentication information, the user service level and so on in the network of the present architecture, generating user security information for authentication, integrity protection and encryption, and implementing validity authentication and authorization for a user after the user accesses. The authentication center supports bi-directional authentication between the network of the present architecture and the user.

ILR/PTF (Identity Location Register/Packet Transfer Function): ILR and PTF may be two functional modules on the same entity and are located in the mapping forwarding plane of the backbone network. ILR maintains/stores the AID-RID mapping relationship of a user in the architecture based on access identifier and location separation in the network, implements registration function, and processes the location inquiry flow of the correspondent node; PTF, after receiving a data message sent by the ASN, routes according to the destination AID and forwards the data message. After the PTF node in the mapping forwarding plane finds the destination AID-RID mapping relationship, the RID information is encapsulated in the header of the data message and the data message is forwarded to the general forwarding plane and then is routed to the correspondent node.

ISN (Interconnect Service Node): it is used to inquire, maintain the AID-RID mapping information of the terminal in the network of the present architecture, encapsulate, route and forward the data message transmitted between the network of the present architecture and the Legacy IP network, and implement the interconnecting and intercommunicating function between the network of the present architecture and the Legacy IP network. When a mobile terminal switches in the present architecture, the ISN serves as an agent anchor point of the mobile terminal between the network of the present architecture and the Legacy IP.

Figure 3:
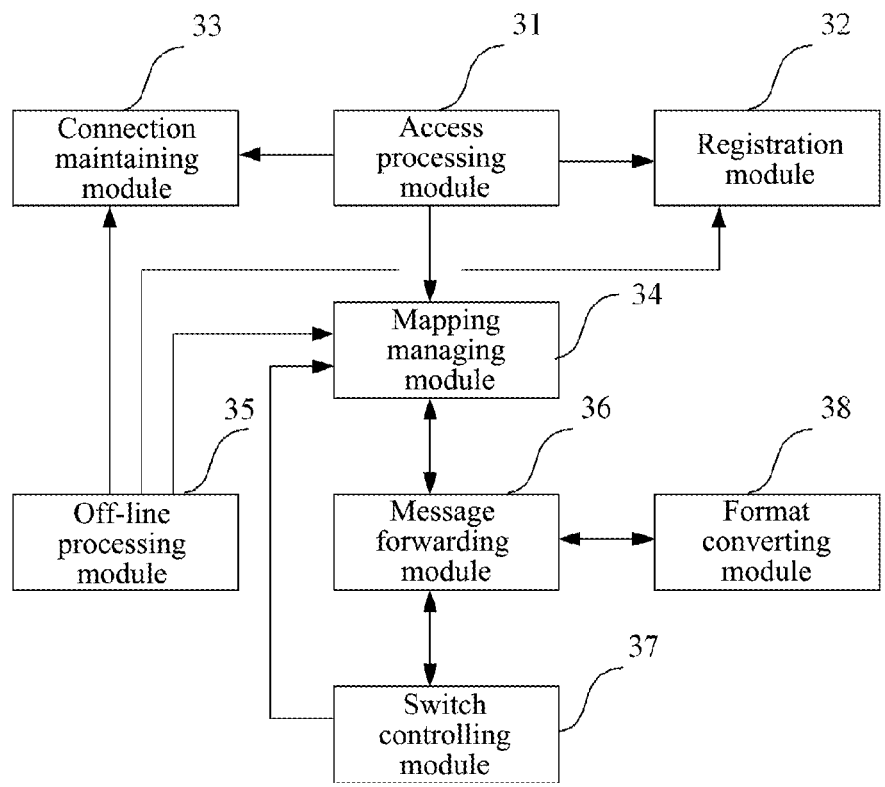
FIG. 3 illustrates the functional modules of the access service node according to an example of the present invention.

As shown in FIG. 3, an ASN comprises the following functional modules: an access processing module 31, which is configured to cooperate with the terminal and the authentication center to accomplish authentication for the terminal when the terminal requests to access, establish a connection with the terminal through the access network, distribute a RID to the terminal, and inform a registration module to initiate registration for the terminal;

a registration module 32, which is configured to, after receiving a notification of registration for the terminal, initiate a registration, which carries the current AID-RID mapping information of the terminal, to the home domain ILR of the terminal; and after receiving a notification of canceling registration for the terminal, notify the terminal home domain ILR to delete the registration information of the terminal, including the AID-RID mapping information of the terminal;

a connection maintaining module 33, which is configured to, during the on-line period after the terminal accesses, maintain the connection between the local ASN and the terminal; and maintain the connection between the local ASN and the ASN to which the correspondent node accesses when the terminal communicates;

a mapping managing module 34, which is configured to cache and maintain the AID-RID mapping information of the terminal after the terminal accesses, and inquire the corresponding RID to the ILR of the mapping forwarding plane according to the AID of the correspondent node after receiving an inquiry notification and locally maintain the inquired AID-RID mapping information;

an off-line processing module 35, which is configured to, after the terminal accessing to the local ASN is off line, notify the connection maintaining module to release the related connection between the terminal and the network, notify the mapping managing module to delete the AID-RID mapping information of the terminal, and notify the registration module to cancel registration for the terminal;

a message forwarding module 36, which is configured to encapsulate the data message sent by the terminal accessing to the local ASN with the RIDs of the terminal and the correspondent node, route and forward to the ASN to which the correspondent node accesses, and decapsulate the data message to be sent to the terminal accessing to the local ASN and then send to the terminal;

wherein, the message forwarding module 36 is further divided into a first forwarding unit and a second forwarding unit, wherein:

the first forwarding unit is configured to, after receiving a data message sent by the terminal accessing to the local ASN, inquire the locally cached AID-RID mapping information according to the AID of the correspondent node as the destination address in the data message, and if the RID of the correspondent node is inquired, encapsulate the RID of the correspondent node, as a destination address, and the RID of the terminal, as a source address, into the data message (for example, they can be encapsulated in the three-layer message header newly added to the data message), and then forward the encapsulated data message to the general forwarding plane; if the RID of the correspondent node is not inquired, perform tunnel encapsulation for the data message and then forward to the mapping forwarding plane, and notify the mapping managing module to inquire the RID of the correspondent node;

the second forwarding unit is configured to, after receiving a data message to be sent to the terminal accessing to the local ASN, strip out the RID encapsulated in the data message, restore to the format of the data message sent from the correspondent node to the ASN and then send to the terminal through the connection between the local ASN and the terminal;

a switch controlling module 37, which is divided into a switch-out controlling unit and a switch-in controlling unit, wherein:

the switch-out controlling unit is configured to, after receiving a switch request, when determining that the terminal is to switch to another ASN (called as switch-in ASN) according to the destination address of the switch, request the switch-in ASN for a switch, and notify the terminal to access to the switch-in ASN after receiving a response, forward the data message sent to the terminal received during the switch to the switch-in ASN, and notify the mapping managing module to delete the AID-RID mapping information of the terminal after completion of the switch; or, send the information of the correspondent node of the terminal to the switch-in ASN or the mapping forwarding plane during the switch;

the switch-in controlling unit is configured to, after receiving a switch request, distribute a RID to the terminal and store the AID-RID mapping information of the terminal, obtain the information of the correspondent node of the terminal from the switch-out ASN and return a switch response, and notify the registration module to initiate a registration flow for the location update of the terminal; the switch-in controlling unit may be further configured to notify the ASNs to which all the correspondent nodes of the terminal access or the ISN anchored when the terminal communicates with the terminal of the Legacy IP network to update the AID-RID mapping information of the terminal.

The network of the present architecture is compatible with the IPV4/IPV6 terminal (refer to the terminal in the existing Legacy IP network that supports IPV4/IPV6 protocol stack), and when the format of the AID is different from that of IPV4/IPV6 address, the ASN needs to act for the IPV4/IPV6 terminal to realize the compatibility processing between the network AID data message and the IPV4/IPV6 data message. Thus, a format converting module 38 needs to be added to the ASN, and the format converting module 38 is configured to covert the IPV4/IPV6 address (may be the source address, or the source address and the destination address) of the terminal in the network of the present architecture in the data message sent by the IPV4/IPV6 terminal accessing to the local ASN to the corresponding AID, and convert all AIDs in the data message to be sent to the IPV4/IPV6 terminal to the IPV4/IPV6 address.

Figure 4:
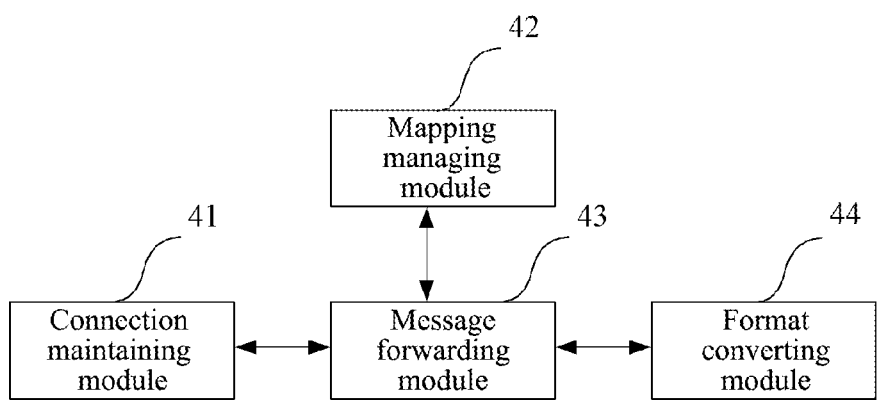
FIG. 4 illustrates the functional modules of the interconnection service node according to an example of the present invention.

As shown in FIG. 4, an ISN comprises the following functional modules:

a connection maintaining module 41, which is configured to establish and maintain a connection between a terminal in the network of the present architecture and a terminal of the Legacy IP network, and when the terminal of the network of the present architecture switches, act as an agent anchor point of the terminal between the network of the present architecture and the Legacy IP to keep the connection with the terminal in the Legacy IP network;

a mapping managing module 42, which is configured to extract and maintain the AID-RID mapping information of the terminal in the network of the present architecture in the data message, and inquire the corresponding RID to the ILR of the mapping forwarding plane according to the AID of the terminal to be inquired after receiving an inquiry notification and locally maintain the inquired AID-RID mapping information;

a message forwarding module 43, which is further divided into a first forwarding unit and a second forwarding unit, wherein, the first forwarding unit is configured to inquire the locally cached AID-RID mapping information according to the AID (as the destination address or obtained through conversion according to the destination address) of the terminal in the network of the present architecture in the data message sent from the Legacy IP network: if the RID corresponding to the AID of the terminal in the network of the present architecture is found, the RID of the terminal in the network of the present architecture is encapsulated, as a destination address, into the data message (for example, it is encapsulated in the newly added three-layer message header), and then the encapsulated data message is forwarded to the general forwarding plane; if the RID corresponding to the AID of the terminal in the network of the present architecture is not found (for example, the data message is the first packet or is a data message of a defaulted route), tunnel encapsulation is performed on the data message and then the data message is forwarded to the mapping forwarding plane, and the mapping managing module is notified to inquire the RID of the terminal in the network of the present architecture;

the second forwarding unit is configured to, after receiving a data message sent from the network of the present architecture, strip out the RID encapsulated in the data message, and send the data message to the terminal in the Legacy IP network or the format converting module.

If the format of the AID adopted in the network of the present architecture is different from that of the IPV4/IPV6 address, the ISL further comprises a format converting module 44, which is configured to convert the IPV4/IPV6 address of the terminal in the network of the present architecture included in the data message sent from the Legacy IP network into the corresponding AID, and then send to the first forwarding unit to forward; and convert the AID of the terminal of the network of the present architecture in the data message decapsulated by the second forwarding unit into an IPV4/IPV6 address format and then send to the terminal in the Legacy IP network.

Figure 5:
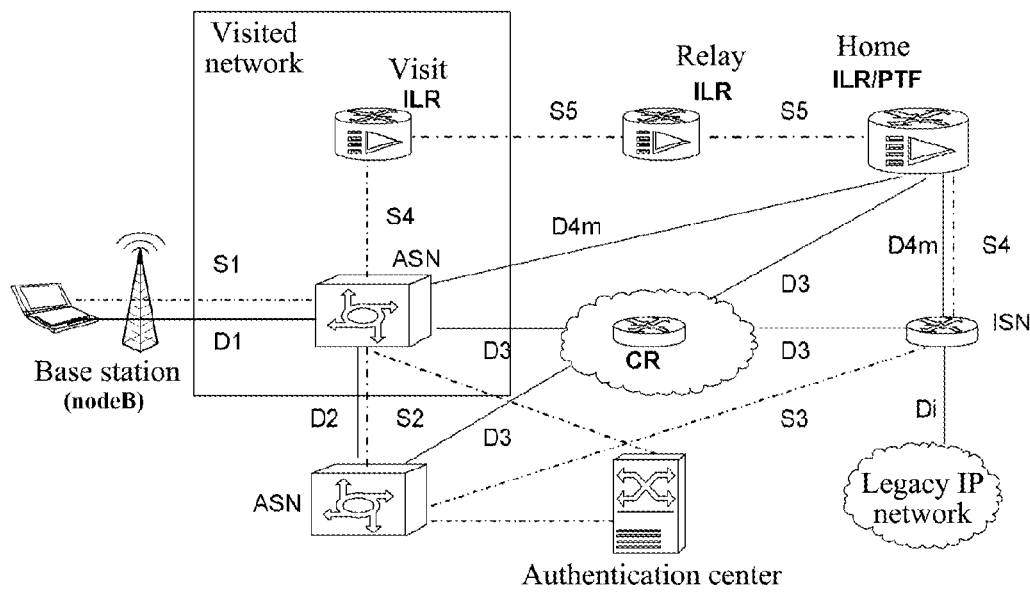
FIG. 5 illustrates the connection relationship between nodes in a network based on identity and location separation architecture according to an example of the present invention.

As shown in FIG. 5, the main interfaces of the present architecture comprise:

S1/D1 interface, which is an interface (or called as a reference point) between a terminal and an ASN. Wherein:

S1 is a signaling interface between the terminal and the ASN, and is mainly used for message flow processing including access management, switch, authentication, charging and registration.

D1 is a data transmitting-receiving interface between the terminal and the ASN. For a terminal compatible with the network of the present architecture, the format of the data message of the D1 interface is:

| Two-layer message header | Source AID | Destination AID | Payload of the data message . . . |
| --- | --- | --- | --- | wherein, the source AID is the AID of the terminal sending a data message, and is used as the source address of the data message; the destination AID is the AID of the correspondent node to which the data message is sent, and is used as the destination address of the data message; the source address and the destination address are encapsulated in the three-layer message header.

S2/D2 interface, which is an interface between ASNs. Wherein:

S2 is mainly used for transmission of switch managing signaling during switch, and transmitting a RID update message when the location of the correspondent node changes.

D2 is mainly used to forward data between ASNs during switch. The format of the data message of the D2 interface is:

| Two-layer message header | Tunnel Encapsulation | Source AID | Destination AID | Payload of the data message . . . |
| --- | --- | --- | --- | --- |

Before forwarding the data message, the ASN adds tunnel encapsulation to the data message. There are various ways for tunnel encapsulation, for example, L2TPv3, IP-in-IP, MPLS (LDP-based and RSVP-TE based), GRE and IPsec, and the present invention is not limited to any particular way of tunnel encapsulation.

S3 is a signaling interface between an ASN and an ISN. During the communication between the terminal of the network of the present architecture and the terminal of the Legacy IP network, if the terminal of the network of the present architecture switches, the ASN will inform the ISN of the new AID-RID mapping information of the terminal of the network of the present architecture through the S3 interface.

D3 is an external interface with the general forwarding plane, and the format of the data message of the D3 interface is:

| Two-layer message header | Source RID | Destination RID | Source AID | Destination AID | Payload of the data message . . . |
| --- | --- | --- | --- | --- | --- |

The data message of the D3 interface is encapsulated with a new three-layer message header based on the data message of the D1 interface, and the new three-layer message header comprises a source RID and a destination RID, wherein, the source RID is the RID distributed to the terminal sending a data packet, while the destination RID is the RID distributed to the correspondent node to which the data packet is sent. However, this encapsulation mode is not unique.

S4 is a signaling interface between the ASN and the mapping forwarding plane, and is mainly used to inquire and maintain AID-RID mapping information.

D4m is a data forwarding interface between the ASN and the mapping forwarding plane, and the format of the data message of the D4m interface is:

| Two-layer message header | Source RID | RIDi | Source AID | Destination AID | Payload of the data message . . . |

The data message of the D4m interface is also encapsulated with a new three-layer message header based on the data message of the D1 interface, and the source address of the new three-layer message header is the source RID, and its destination address is RIDi, wherein, the source RID is the RID distributed to the terminal sending a data packet, while the RIDi is the routing address of ILR/PTF in the mapping forwarding plane connected with the ASN, and is obtained from the configuration data on the ASN.

S5 is a signaling interface between ILRs in the mapping forwarding plane, and is mainly used for inquiring and maintaining the AID-RID mapping information, and the routing information interaction within the mapping forwarding plane.

Di interface is a data forwarding interface between the network of the present architecture and the Legacy IP network, and the format of the data message of the Di interface is the same as that of the data message of the Legacy IP network, which is as follows:

| Two-layer message header | Source IPV4/IPV6 | Destination IPV4/IPV6 | Payload of the data message . . . |

In view of the progressive characteristic of network evolution, the terminal in the present architecture mainly has two types:

IPV4/IPV6 terminal, which refers to a terminal supporting the existing IPV4/IPV6 protocol stack in the Legacy IP network;

AID terminal, which refers to a terminal whose protocol stack has been upgraded to be able to support the AID coding requirement, wherein, the IPV4/IPV6 address layer in the previous IPV4/IPV6 protocol stack is expanded to be able to support an AID coding address with expanded IPV4/IPV6 address bit length; meanwhile, compatibility processing is also performed at the terminal for the upper-layer service application. The ASN further needs to support the access managing function of the AID terminal and the IPV4/IPV6 terminal, and achieves AID agency function for the IPV4/IPV6 terminal, and is responsible for acting for the IPV4/IPV6 terminal to realize the compatibility processing between the AID data message of the architecture based on access identifier and location separation in the network and the IPV4/IPV6 data message.

The method for implementing access identification of a user terminal within the network of the present architecture, i.e., the AID coding mechanism, will be described below by taking an IPV4 terminal as an example. The embodiments involved in this text are also applicable to an IPV6 terminal.

In view of the architecture based on access identifier and location separation in the network per se, the requirement for AID coding is just meeting the requirement for the number of coding spaces, i.e., the maximum coding length of AID should meet the requirement on the maximum number of nodes.

However, at the meantime of the AID meeting the requirement for the number of coding spaces, the interconnection and intercommunication with the traditional IP network and the compatibility with the upper-layer application should also be taken into consideration such that the various application programs of the IPV4 network can transplant smoothly to the architecture based on access identifier and location separation in the network. Therefore, the emphases needing to be considered for the AID coding mechanism comprise the followings.

1) Most of the application programs in the existing network are application based on IPV4, so the AID coding mechanism should be compatible with the format of the IPV4 address in order to be compatible with the upper-layer application program;

2) the terminal in the present architecture needs to visit the application in the Legacy IPV4 network, and has a demand for intercommunicating with the Legacy IPV4 network, so the coding space of AID and the IPV4 address space of the Legacy IPV4 network should not have ambiguity so that the visited correspondent node can be uniquely distinguished;

3) the network architecture based on an identity location separation architecture serves as an expansion component of a traditional Legacy IPV4 network, and the coding space of AID should conform to the IP address layer coding regulations in the traditional Legacy IPV4 network. On the interface for interconnection and intercommunication with the traditional Legacy IPV4 network, AID adopts a private network address of IPV4, or a public IPV4 address that is specially distributed to the network of the network architecture based on the identity location separation architecture.

Based on the consideration for the above factors, this example provides a specific method for implementing access identification based on the present architecture, wherein the AID format is defined as: Expand Header (EH)+suffix (suffix32). The AID is used to identify the correspondent node within the network architecture based on identity location separation architecture, and an AID uniquely identifies a user identity. An IPV4 address is adopted to uniquely identify the correspondent node for intercommunication with the Legacy IPV4.

Wherein, the value of 32 bit of suffix, suffix32, is the private network address in IPV4 format, and the bit length of the EH and its value are singularly defined as needed within the architecture based on identity location separation. In this way, the expand header of the AID is removed to covert to the corresponding IP address, and the IP address is converted to the corresponding AID by adding a constant as the expand header. As a variation of this example, the coding format of AID may also adopt the format of an IPV4 public network address plus a constant as a suffix, and the coding format of AID may further adopt the format of an IPV4 private network address plus a constant as a suffix.

Description will be made in this example for the case where an IPV4 private network address is used for the suffix part of the AID. When the suffix suffix32 is an IPV4 private network address, in view of a Legacy IPV4 network, the architecture based on access identifier and location separation communicates, as a private network of the Legacy IPV4 network, with the Legacy IP network; and the IPV4 terminal in the architecture based on access identifier and location separation accesses to the network as a private network node in the Legacy IPV4 network and communicates with other nodes.

When a user uses a terminal to communicate in the network of the present architecture, the mode for configuring an AID for the terminal may be one of the following modes, and different modes may be adopted for different terminals.

The first is a mode of configuring by the network, i.e., the AID of the user is stored in the authentication center, the user identifier is sent to the authentication center when the terminal is authenticated, the authentication center sends the AID together with the user identifier to the ASN, the ASN stores the AID and sends it to the terminal. When the terminal is an IPV4/IPV6 terminal, the ASN needs to convert the AID to the corresponding IPV4/IPV6 address before sending it to the terminal.

Network users of different standards have different user identifiers, for example, the user identifier is international Mobile Subscriber Identification (IMSI) in the cellular mobile communications network, while in fixed networks like ADSL, the user identifier is network access identification (NAI) or user name (Username).

The second is the mode of configuring by the terminal, i.e., the AID is stored in a user identification module (such as a SIM card, a UIM card and so on) of the terminal, and the terminal configures the corresponding IPV4 address in the protocol stack. When the terminal accesses to the network, the terminal reads AID information from the SIM/UIM card, the AID is sent to the ASN in an access signaling, and the ASN stores the AID of the terminal. The AID terminal (referring to the terminal where the protocol stack supports AID coding requirement) directly uses the AID for the source address in the transmitted data message, the source address in the data message sent by the IPV4/IPV6 terminal adopts an IPV4/IPV6 address corresponding to the AID of the terminal, and the ASN converts it to the corresponding AID.

In the network of the present architecture, the RID number may adopt the format of IPV4/IPv6 address universally supported by the routers in the existing Legacy IP network to indicate the current ASN location of the terminal. The action scope of the RID is in the general forwarding plane of the backbone network of the network of the present architecture.

The backbone network of the network of the present architecture performs routing forwarding using the format of data message. When the terminal registers or switches to the network, the ASN distributes a RID to the terminal according to a predetermined policy, and the RID distributed by the ASN should point to the ASN. According to service requirements, the ASN may distribute one or more specialized RIDs to the terminal, or distribute the same RID to a plurality of terminals.

The present architecture is based on the technology principle of location and identity separation, the main affecting factors for the network topology in the general forwarding plane are the number and deploying mode of the functional entities such as ASN and ISN, and the location change of the accessed terminal has no direct relation with the network topology, thereby eliminating the influence of the mobility of the terminal host on the measurability of the routing system. In the Legacy IP network, the basis of routing is the IP address, this IP address is basically one-to-one corresponding to the number of communication hosts, and the scale of the routing table is positively correlated with the number of the communication hosts. Especially in a scene of IPV4/IPV6 dual-stack, the scale of the routing table will increase exponentially. Large scale of the routing table and its frequent change will cause increase of the time for routing convergence. RID is used as the routing basis in the general forwarding plane in the present architecture, ASN and ISN can distribute to a plurality of accessed users the same RID, which indicates the locations of the ASN and ISN. From this viewpoint, the number of routing items in the general forwarding plane is mainly positively correlated with the numbers of ASN and ISN, thereby reducing the relevance with the number of accessed users. The complexity of network topology is reduced by solving the mobility problem, and the relevance between the scale of the routing table and the number of accessed users is reduced by way of a plurality of accessed terminals sharing a RID, thus increasing the measurability of the routing system.

The operation process of how to use the above AID coding to implement addressing and forwarding of a data message when terminals in the present architecture communicate with each other, or the terminal in the present architecture communicates with a terminal in the traditional IP network will be described below in further detail with reference to the drawings and the specific examples.

Example One

Description will be made in this example in terms of the interaction process between an IPV4 terminal in the network of the present architecture and an AID terminal.

The flow of interaction between terminals within the present architecture will be described in this example by using, for example, an IPV4 terminal as a source terminal and an AID terminal as a destination terminal. The source address and destination address of the data message transmitted and received by the IPV4 terminal is of the IPV4 format. When a data message sent to the IPV4 terminal is received, the source AID and destination AID carried in the data message are of the format of expand header+IPV4 address, the ASN strips out the expand header portion of the source AID and the destination AID to convent to an IPV4 address format identifiable to the IPV4 terminal, and then forwards it to the IPV4 terminal; when a data message sent from the IPV4 terminal is received, the ASN needs to convert the source address and the destination address of the IPV4 format to the corresponding AIDs. The specific flow is as follows.

Step 1, when an IPV4 terminal MN accesses to the network of the present architecture, a unique point-to-point connection relationship with the ASN is established, and through this point-to-point connection relationship, the ASN can uniquely find the corresponding IPV4 terminal.

Specifically, this point-to-point connection relationship is a GTP (GPRS Tunneling protocol) connection in mobile standard of GSM (Global System for Mobile Communications)/WCDMA (Wideband Code Division Multiple Access)/TD-SCDMA (Time Division-Synchronous CDMA); this point-to-point connection relationship is a PPP (Point to Point Protocol) connection in a CDMA mobile standard; and in a fixed broadband access network, this point-to-point connection relationship is a PPP connection.

The ASN will store the binding relationship between the AID identifier of the MN and the point-to-point connection relationship, which is as shown in the following table 1:

| | |
|---|---|
| point-to-point connection relationship Connect1 | AID1 |
| point-to-point connection relationship Connect2 | AID2 |
| point-to-point connection relationship Connect3 | AID3 |
| . . . | . . . |
| point-to-point connection relationship Connectn | AIDn |

Step 2, the AID terminal in the network of the present architecture, CN, sends a data message to MN, the source address of the data message sent by CN is the AID of CN, and the destination address is the AID of MN, and the formats of the source address and the destination address are both expand header+IPV4 address, as shown in the following table 2:

| Source AID | Destination AID | Payload of the data message . . . |
|---|---|---|

Step 3, when the ASN where the CN is located receives a data message sent by the CN, the ASN searches for and encapsulates the RID of CN and the RID of MN and then sends the data message to the ASN where the MN is located through the backbone network.

Step 4, since the terminal MN may communicate with a plurality of CNs simultaneously, when the MN responds with a data message subsequently, the MN cannot uniquely correspond to the CN only according to the IPV4 private network address of the CN, so when the ASN where the MN is located receives a data message sent to the MN, the ASN will distributes a connection identifier SN to the source AID in the data message so as to uniquely determine the correspondent node, wherein the SN is of the format of IPV4 address and uniquely identifies a connection identifier in the communication connection corresponding to the MN.

A correspondent node table will be stored in the ASN, wherein, the corresponding relationship between the AID of the correspondent node of each terminal and the SN is stored, for example, as shown in the following table 3:

| AID1 | Correspondent AID11/SN1 | Correspondent AID12/SN2 | . . . | Correspondent AID1n/SNn |
|---|---|---|---|---|
| AID2 | Correspondent AID21/SN1 | Correspondent AID22/SN2 | . . . | Correspondent AID2m/SNm |
| . . . | | | | |
| AIDn | Correspondent AIDn1/SN1 | Correspondent AIDn2/SN2 | . . . | Correspondent AIDns/SNs | wherein, AID11, AID12, . . . AID1n refer to the AIDs of the $1^{st}$ to the $n^{th}$ correspondent node of the terminal AID1 respectively; SN1, SN2, . . . SNn refer to the SNs distributed to the $1^{st}$ to the $n^{th}$ correspondent node of the terminal AID1 respectively.

Step 5, the ASN where the MN is located replaces the destination AID with the IPV4 address portion of the destination AID and writes the IPV4 address portion of the destination AID in the destination address unit item in the data message, replaces the source AID with the SN (in the IPV4 address format) as the source address unit item, and then inquires the binding relationship in Table 1 through the AID of the MN to obtain the corresponding point-to-point connection relationship, and send the converted data message to the MN through the point-to-point connection relationship.

The format of the converted data message is as follows.

| Source SN | Destination IPV4 address | Payload of the data message . . . |
|---|---|---|

Step 6, the ASN where the MN is located receives the data message responded by the MN, wherein the source address in the data message is the IPV4 address portion of MN, and the destination address is SN, and the format of the data message is as follows.

| Source IPV4 address | Destination SN | Payload of the data message . . . |
|---|---|---|

Step 7, since the source IPV4 address may be a private network address, and other accessed terminals may also use the same address, the data message transmitted and received by the MN cannot be identified through the source IPV4 address. Therefore, the ASN always keeps a point-to-point connection relationship with each accessed terminal, and the forwarding path of the data message sent to or sent from the terminal always passes by this point-to-point connection. Thus, the data message stream transmitted and received by the terminal can be uniquely determined through the point-to-point connection. After the ASN where the MN is located receives the data message sent by the MN, the binding relationship in Table 1 is inquired according to the point-to-point connection relationship of MN to obtain the corresponding AID, and the source IPV4 address in the data message is replaced with the corresponding AID.

Step 8, the ASN where the MN is located inquires Table 3 according to the destination address SN (in the IPV4 address format) filled by MN, and replaces SN with the AID of CN according to the corresponding relationship between the SN and the AID of CN. At the moment, the format of the data message is:

| Source AID | Destination AID | Payload of the data message . . . |
|---|---|---|

Step 9, after the ASN where the MN is located finishes processing including RID encapsulation of the data message, the ASN sends the data message to the backbone network for forwarding processing, and the backbone network routes and forwards the data message to the ASN where the CN is located according to the RID encapsulated in the data message.

By now, a complete addressing and transmitting-receiving process of a data message is completed.

Wherein, the distribution scheme for the SN occupying the IPV4 address field may adopt the following mode:

when the IPV4 address is planned, the IPV4 address field occupied by the SN is of a monopolization mode so as to avoid ambiguity. The number of the IPV4 address fields monopolized by the SN should be no less than the number of possible end-to-end connections of each terminal node. The field of IPV4 address may be a public network IP address, or a private network IP address. When a private network address space is used, within the range of the architecture based on access identifier and location separation in the network, the private network address occupied by the SN cannot be used for other applications so as to avoid overlapping distribution with the IPV4 address portion constituting the AID (whose format is Expand Header+IPV4 address) access identifier.

In the point-to-point connection between a terminal A and an ASN, the SN is used to identity the end-to-end data stream between the terminal A and different correspondent nodes. When the ASN distributes the SN, it should be ensured that the SNs distributed to the same terminal accessed under the ASN are not repeated, and the SNs distributed to different terminals may be repeated. For example:

two terminals accessed under the ASN are terminal A1 and terminal A2 respectively, the correspondent nodes keeping a communication relationship with the terminal A1 include correspondent nodes B1, B2 and B3, and the correspondent nodes keeping a communication relationship with the terminal A2 include correspondent nodes C1, B2 and C3.

The ASN will distribute different SN1, SN2 and SN3 to the end-to-end connections A1-B1, A1-B2 and A1-B3. Wherein, SN1, SN2 and SN3 are different IPV4 addresses respectively.

Meanwhile, the ASN will distribute different SN1, SN2 and SN3 to the end-to-end connections A2-C1, A2-B2 and A2-C3, wherein, SN1, SN2 and SN3 are different IPV4 addresses respectively, but their values may be same as that of the SN occupied by A1.

Example Two

Description will be made in this example on the addressing and forwarding process of a data message when the terminals within the network of the present architecture interact with each other by taking an AID terminal as an example.

Figure 6:
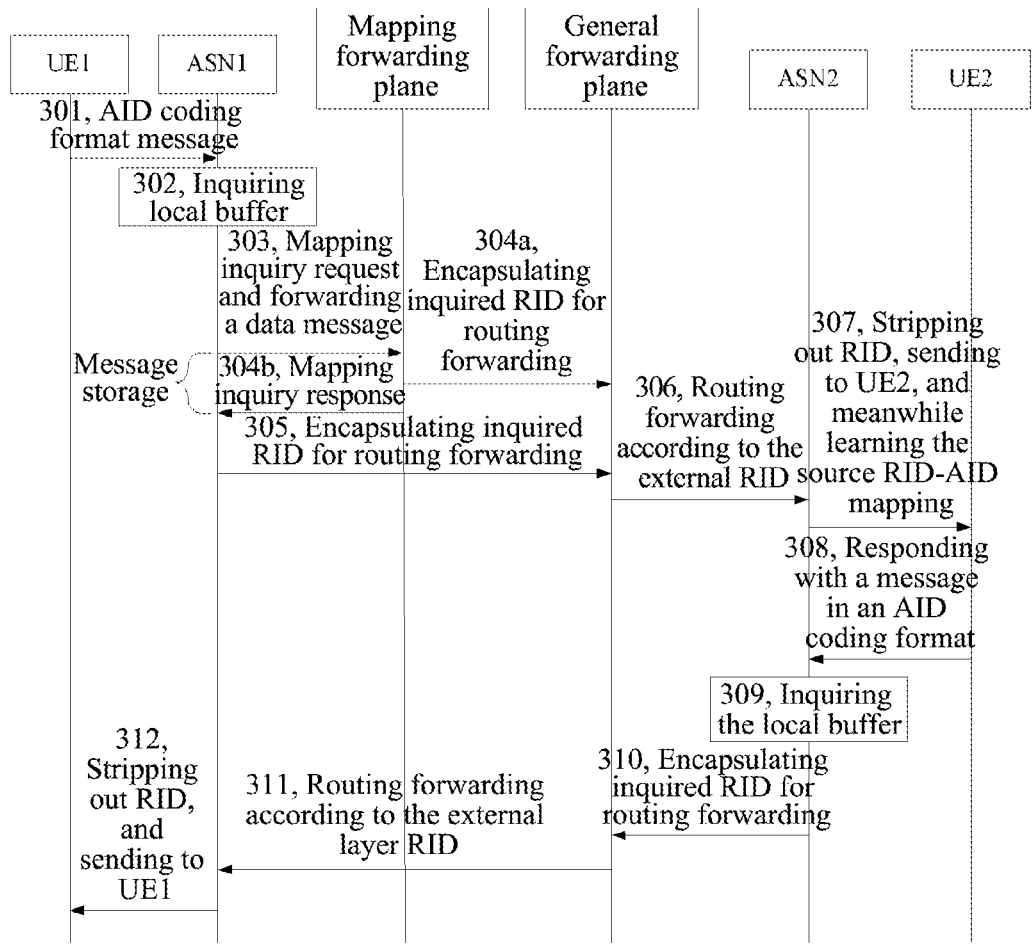
FIG. 6 illustrates the process of addressing and forwarding when an AID terminal receives and transmits a data message according to an example of the present invention.

FIG. 6 illustrates the whole sending flow of uplink and downlink data messages of an AID terminal. As shown in FIG. 6, the process mainly comprises the following steps:

step 301, ASN1 where terminal UE1 is located receiving a data message sent from UE1, wherein the source address and the destination address carried in the data message are both in the AID coding format;

step 302, ASN1 searching for the corresponding destination RID locally according to the destination AID; if the corresponding destination RID is found, executing step 305; otherwise, executing step 303;

step 303, sending a mapping inquiry request to the mapping forwarding plane, and meanwhile forwarding the data message to the mapping forwarding plane to process;

wherein, when the ASN cannot find mapping information locally, the ASN may determine whether first-packet forwarding is needed according to the configuration policy, and if yes, the ASN forwards the data message to the mapping forwarding plane to forward at the same time; if first-packet forwarding is not needed and the first-packet policy is discarding, then the data message is discarded; if first-packet forwarding is not needed and the first-packet policy is storing, then the data message is stored.

Step 304, the mapping forwarding plane inquiring the corresponding destination RID according to the mapping inquiry request sent by ASN1 and the data message, and inquiring the RID corresponding to the source AID;

step 304a, encapsulating the inquired RID in the header of the data message (for example, adding the destination RID routing information to the data message), and forwarding to the general forwarding plane;

step 304b, the mapping forwarding plane returning the inquired AID-RID mapping to ASN1 through a mapping inquiry response message;

after the ASN receives the response, the ASN stores the AID-RID mapping information thereof in the local buffer; in addition, the ASN stores the data message before the response is received.

The order of step 304a and step 304b is not defined in the present invention.

Step 305, ASN1 performing data message encapsulation according to the inquired destination RID and source RID and then forwarding the data message to the general forwarding plane after encapsulation;

step 306, the general forwarding plane routing and forwarding to ASN2 according to the RID encapsulated in the external layer of the data message;

step 307, upon receiving the data message sent to UE2, ASN2 performing decapsulating processing to the data message, stripping out the RID, and sending the data message to UE2;

meanwhile, ASN2 learns the source RID-AID mapping in the data message, i.e., if when ASN2 receives the data message, ASN2 inquires the mapping information in the local buffer, and if the local buffer does not store the source RID-AID mapping information, i.e., the mapping information of UE1, the mapping information of UE1 is stored locally according to the source RID and AID in the data message.

Step 308, UE2 responding with a data message, wherein the source address and destination address are in the AID coding format;

step 309, after receiving the responded data message, ASN2 inquiring the locally cached mapping information according to the destination AID in the data message;

since ASN2 has learned the mapping relationship of UE1 in the above flow, the mapping relationship can be found locally in ASN2;

step 310, ASN2 encapsulating the inquired RID and then sending to the general forwarding plane;

step 311, the general forwarding plane sending the data message to ASN1 according to the external layer RID;

step 312, ASN1 decapsulating the data message, stripping out the RID encapsulation, and then sending the data message to UE1.

When ASN1 receives the responded data message, after decapsulation, ASN1 can inquire whether the ASN2-UE2 mapping relationship has been learned (it should have been learned in normal cases, but the case where the responded data message arrives first is not excluded), and if it has not been learned, then the mapping relationship is learned so that the mapping relationship inquiry does not need to be performed in the mapping forwarding plane for subsequent data messages.

By now, a complete process of data interaction is completed.

Example Three

Figure 7:
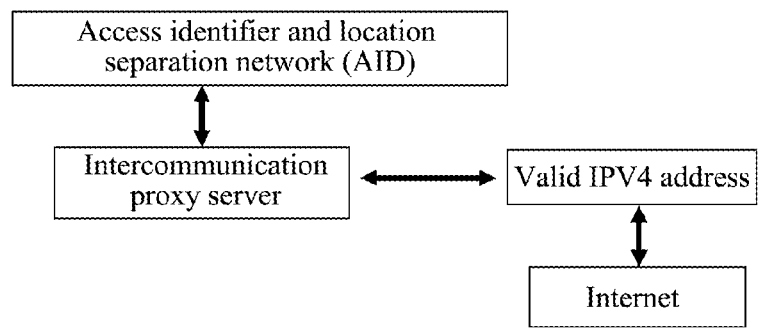
FIG. 7 illustrates an intercommunication proxy server implementing the function of address conversion according to an example of the present invention.

As shown in FIG. 7, in a preferred example, the AID within the architecture based on identity location separation is translated to an IPV4 public network address by incorporating an intercommunication node (for example, an intercommunication proxy server) between an IPV4 network and a network architecture based on identity and location separation architecture, thereby achieving interconnection and intercommunication between the present architecture and the IPV4 network. This intercommunication proxy server may be disposed within an ISN.

The terminal uses an AID to identify the correspondent node within the network based on identity and location separation architecture, and an IPV4 public network address is used when the internal terminal intends to communicate with an external Internet network (for example, an IPV4 network). The intercommunication proxy server is responsible for converting the internal AID address (expand header+IPV4 private network address) to an IPV4 public network address so that it is used normally in an external public network. Wherein, for the implementation of the specific converting function of the intercommunication proxy server, reference may be made to the NAT (Network Address Translation) device in the existing network, which converts a private network address to a public network address by way of a private network address+a port number; the intercommunication proxy server only differs from the NAT device in that a private network address with an expand header is converted to a public network address.

On the contrary, when a first terminal in a traditional IPV4 network communicates with a second terminal in the network of the present architecture, the intercommunication proxy server distributes to the second terminal a connection identifier, which may adopt an IP public network or private network address, identifiable to the first terminal, and stores the corresponding relationship between the connection identifier and the AID of the second terminal. The first terminal uses this connection identifier to communicate with the second terminal, and the intercommunication proxy server obtains the AID of the second terminal according to the corresponding relationship between the connection identifier and the AID of the second terminal, and realizes the conversion between the AID of the second terminal and the corresponding connection identifier.

The above examples are all descriptions on an IPV4 terminal or an AID terminal, and the implementing mechanism where the AID is in an IPV6 format will be further described in detail below.

In the present architecture, an IPV6 address coding format may be used as the coding of the AID, and the AID adopts 128 bit coding. The format of the AID is: 96 bit Expand Header+32 bit suffix32 (IPV4 private network address).

There is enough address space when an IPV6 coding format is adopted, and the requirement on a larger number of AID coding spaces can be met. The existing devices can support the IPV6 protocol stack very well, and industrialization level of the adaptive modification of the upper-layer application for IPV6 is quite high. The terminal supporting IPV6 protocol stack can be used as the accessed terminal in the architecture based on identity and location separation without any change, AID may be entered at the terminal and the correspondent may be identified by the AID, and direct end-to-end intercommunication is supported.

The network based on identity and location separation architecture can be used to rich and supplement the IPV6 protocol stack, and serves as a component of the IPV6 protocol stack.

The present invention further provides a communication node applied to an access identifier and location separation network, comprising an access unit and a message forwarding unit, wherein:

the access unit is configured to establish, for each accessed terminal, a binding relationship between a first identifier of the terminal and a transmitting-receiving link;

the message forwarding unit is configured to, when receiving a data message sent from the terminal on the transmitting-receiving link, if a source address of the data message is a second identifier of the terminal, convert the source address to the first identifier of the terminal according to the binding relationship and then send the data message to a backbone network for forwarding; and, when receiving a data message whose destination address is the first identifier of the terminal, convert the first identifier to the second identifier, and forward the converted data message to the terminal through the transmitting-receiving link corresponding to the first identifier according to the binding relationship.

Wherein, the first identifier is an identity identifier of the terminal, and the second identifier is a private network IP address of the terminal, and the identity identifier of the terminal is composed of the private network IP address of the terminal, and prefix/suffix information;

the message forwarding unit is configured to implement conversion between the first identifier and the second identifier by removing or adding the prefix/suffix information.

The example of the present invention further provides another communication node applied to an access identifier and location separation network, comprising a connection identifier distributing unit and an address converting unit, wherein:

the connection identifier distributing unit is configured to, when receiving a data message sent from an correspondent node to a terminal, distribute a connection identifier to the correspondent node of the terminal according to an identity identifier of the correspondent node in a source address of the data message, and store a corresponding relationship between the connection identifier and the identity identifier of the correspondent node;

the address converting unit is configured to replace the source address in the data message sent to the terminal with the connection identifier according to the corresponding relationship and then send the data message to the terminal; and, after receiving the data message using the connection identifier as a destination address from the terminal, replace the destination address in the data message with the identity identifier of the correspondent node according to the corresponding relationship and then forward the data message to the correspondent node.

Wherein, the communication node is an access service node in the identity identifier and location separation network, or an intercommunication node for achieving intercommunication between the identity identifier and location separation network and a legacy IP network.

Wherein, the connection identifier distributing unit may distribute the same or different connection identifiers to the correspondent nodes of different terminals.

In conclusion, when the present invention incorporates the architecture based on access identifier and location separation in the network, since the architecture changes the logical meaning of the terminal IP address layer, the dual meaning of location identifier and access identifier of the original IP address layer is changed to only identifying the user identifier without the logical meaning of location identifier. When mixed networking is implemented using the network of the present architecture and the traditional IP (i.e., Legacy IP) network, the access identifier of the terminal in the network of the present architecture adopts an IPV4/IPV6 address, corresponding processing is performed through identifying two different meanings, the access recognition defined in the architecture based on access identifier and location separation in the network is distinguished from the IP address of the Legacy IP network, thereby solving the problem of scarcity of IPV4/IPV6 address space caused by that dynamic distribution cannot be implemented for the access recognition is assigned to a certain user exclusively under the architecture based on access identifier and location separation in the network.

A person having ordinary skill in the art can appreciate that all or part of the steps in the above step can be implemented by instructing related hardware through a grogram, which may be stored in a computer readable storage medium, such as read-only memory, disk or an optical disk, and so on. Optionally, all or part of the steps in the above examples can be also implemented using one or more integrated circuits. Correspondingly, each module/unit in the above examples can be implemented in the form of hardware, or in the form of software functional module. The present invention is not limited to any specific form of combination of hardware and software.

Although the present invention is described with reference to particular examples, a person having ordinary skill in the art can make modifications and transformations without departing from the sprit or scope of the present invention. Such modifications and transformations, however, shall be regarded as within the scope of the description and the scope of the attached claims.

INDUSTRIAL APPLICABILITY

The present invention provides a communication method, and a method for forwarding a data message during the communication process and a communication node, wherein, the configuration mode for identity recognition is clarified, and under the architecture based on access identifier and location separation in the network, a specific method for implementing identity recognition is provided, and the processing performed by each network element is regulated; the requirement for the number of the coding spaces is met, meanwhile the present invention realizes the intercommunication and interconnection with the legacy IP network, realizes the compatibility with the upper application programs of IPv4/IPv6, and supports the various application programs of the IPv4/IPv6 network to transplant smoothly to the architecture based on access identifier and location separation in the network.

What is claimed is:

1. A communication method applied to an access identifier and location separation network, comprising:
   an access service node establishing, for each accessed terminal, a binding relationship between a first identifier of the terminal and a transmitting-receiving link; and
   when receiving a data message sent from the terminal on the transmitting-receiving link, if a source address of the data message is a second identifier of the terminal, the access service node converting the source address to the first identifier of the terminal according to the binding relationship and then sending the data message to a backbone network for forwarding;
   wherein the first identifier is an access identifier of the terminal, the second identifier is a private network IP address of the terminal, the access identifier of the terminal comprises the private network IP address of the terminal, and prefix/suffix information, the prefix/suffix information is a constant or variable determined based on the access identifier and location separation network.

2. The method according to claim 1, wherein,
   the access identifier of the terminal adopts an address coding format of IPV6.

3. The method according to claim 1, wherein,
   the transmitting-receiving link is a point-to-point connection relationship established by the access service node for the terminal.

4. The method according to claim 3, wherein,
   the point-to-point connection relationship is a General Packet Radio Service Tunneling Protocol (GTP) connection or a point-to-point protocol (PPP) connection.

5. A communication method applied to an access identifier and location separation network, comprising:
   an access service node establishing and storing, for an accessed terminal, a corresponding relationship between a first identifier and a second identifier of the terminal, and a binding relationship between the first identifier and a transmitting-receiving link, wherein the transmitting-receiving link is a point-to-point connection relationship between the access service node and the terminal; and
   when receiving a data message whose destination address is the first identifier of the terminal, the access service node converting the first identifier to the second identifier according to the corresponding relationship, and then inquiring the binding relationship through the first identifier of the terminal to obtain a corresponding point-to-point connection relationship, and sending the converted data message to the terminal through the corresponding point-to-point connection relationship.

6. The method according to claim 5, wherein,
   the first identifier is an access identifier of the terminal, and the second identifier is a private network IP address of the terminal.

7. The method according to claim 6, wherein,
   the access identifier of the terminal is composed of the private network IP address of the terminal and prefix/suffix information, and the prefix/suffix information is a constant or variable determined based on the access identifier and location separation network, and/or,
   the access identifier of the terminal adopts an address coding format of IPV6.

8. The method according to claim 5, wherein,
   the transmitting-receiving link refers to a point-to-point connection relationship established by the access service node for the terminal, and the point-to-point connection relationship is a General Packet Radio Service Tunneling Protocol (GTP) connection or a point-to-point protocol (PPP) connection.

9. A communication method applied to an access identifier and location separation architecture network, comprising:
   when an access service node to which a terminal accesses receives a data message sent from a correspondent node to the terminal, the access service node distributing a connection identifier to the correspondent node of the terminal according to an access identifier of the correspondent node in a source address of the data message, and storing a corresponding relationship between the connection identifier and the access identifier of the correspondent node; and
   when the terminal communicates with the correspondent node through the connection identifier, the access service node to which the terminal accesses obtaining the access identifier of the correspondent node according to the corresponding relationship to determine the correspondent node, and realizing conversion between the access identifier of the correspondent node and the connection identifier.

10. The method according to claim 9, wherein,
   the connection identifier is a public network address or a private network address in a traditional communication network.

11. The method according to claim 9, the method further comprising:
the access service node distributing the same or different connection identifiers to the correspondent nodes of different accessed terminals.

12. A communication method used for realizing intercommunication between an access identifier and location separation network and a legacy IP network, comprising:
when receiving a data message sent from the access identifier and location separation network to the legacy IP network, an intercommunication node converting a first identifier of the data message to a corresponding second identifier and then sending the data message to the legacy IP network;
when receiving a data message sent from the legacy IP network to the access identifier and location separation network, the intercommunication node converting the second identifier in the data message to the corresponding first identifier and then sending the data message to the access identifier and location separation network;
wherein the first identifier is an access identifier which is uniquely distributed to a terminal in the access identifier and location separation network, and the access identifier is used in an access network of the access identifier and location separation network and keeps unchanged during the movement process of the terminal;
the second identifier is an IP address.

13. The method according to claim 12, wherein,
the access identifier is composed of a private network IP address of the terminal and prefix/suffix information;
the second identifier is a public network IP address.

14. A communication method used for realizing intercommunication between an access identifier and location separation network and a legacy IP network, comprising:
when a first terminal in the legacy IP network communicates with a second terminal in the access identifier and location separation network, an intercommunication node distributing to the second terminal a connection identifier identifiable to the first terminal and storing a corresponding relationship between the connection identifier and an access identifier of the second terminal, and when the first terminal communicates with the second terminal through the connection identifier, the intercommunication node obtaining the access identifier of the second terminal according to the corresponding relationship to determine the second terminal and realizing conversion between the access identifier and the connection identifier of the second terminal.

15. The method according to claim 14, wherein,
the connection identifier is a public network IP address or a private network IP address in the legacy IP network.

16. The method according to claim 14, wherein,
the intercommunication node distributes the same or different connection identifiers to the second terminals communicating with different first terminals.

17. A method for forwarding a data message during a communication process applied to an access identifier and location separation network, comprising:
when an access service node to which a terminal accesses receives a data message sent from a correspondent node to the terminal, the access service node distributing a connection identifier to the correspondent node according to an access identifier of the correspondent node in a source address of the data message, and storing a corresponding relationship between the connection identifier and the access identifier of the correspondent node;
the access service node to which the terminal accesses replacing the source address in the data message with the connection identifier and then sending the data message to the terminal;
after receiving the data message in which the source address is the connection identifier, the terminal responding to the correspondent node with a data message using the connection identifier as a destination address;
after receiving the data message with which the terminal responds, the access service node to which the terminal accesses searching for the stored corresponding relationship according to the connection identifier to obtain the access identifier of the correspondent node, and replacing the destination address in the data message with the access identifier of the correspondent node and then forwarding the data message to an access node to which the correspondent node accesses.

18. A method for forwarding a data message during a communication process applied to an access identifier and location separation network, comprising:
an access service node to which a terminal accesses establishing a point-to-point connection relationship for the terminal, and storing a binding relationship between the point-to-point connection relationship and an access identifier of the terminal;
when the terminal sends a data message to a correspondent node through the point-to-point connection relationship, the access service node to which the terminal accesses replacing a source address in the data message with the access identifier of the terminal according to the binding relationship, and then sending the data message to an access service node where the correspondent node is located;
after receiving the data message, the access service node where the correspondent node is located distributing a connection identifier to the terminal according to the access identifier of the terminal therein, and storing a corresponding relationship between the connection identifier and the access identifier of the terminal; then replacing the source address in the data message with the connection identifier and then sending the data message to the correspondent node; and
the correspondent node responding with a data message using the connection identifier as a destination address, and the access service node where the correspondent node is located replacing the destination address in the data message with the access identifier of the terminal according to the stored corresponding relationship and then sending the data message to the access service node where the terminal is located.

19. The method according to claim 18, wherein,
the access identifier comprises a private network IP address part in a traditional communication network, and prefix/suffix information; the prefix/suffix information is a constant or variable determined based on the access identifier and location separation network; and/or,
the access identifier adopts an address coding format of IPV6.

20. The method according to claim 18, wherein,
the connection identifier is a public network IP address or a private network IP address in the traditional communication network.

21. The method according to claim 18, wherein,
the access service node distributes the same or different connection identifiers to the correspondent nodes of different accessed terminals.

22. A communication method applied to an access identifier and location separation network, comprising:
a first access service node establishing a first point-to-point connection relationship and a second point-to-point connection relationship respectively for a first terminal and a second terminal that have accessed, and storing binding relationships between the point-to-point connection relationships and access identifiers of corresponding terminals respectively;
when receiving a data message using the access identifier of the first terminal as a destination address, the first access service node distributing a first connection identifier to an correspondent node of the first terminal according to the access identifier of the correspondent node in a source address in the data message, and storing a corresponding relationship between the first connection identifier and the access identifier of the correspondent node; and
when receiving a data message using the access identifier of the second terminal as a destination address, the first access service node distributing a second connection identifier to an correspondent node of the second terminal according to the access identifier of the correspondent node in a source address in the data message, and storing a corresponding relationship between the second connection identifier and the access identifier of the correspondent node;
wherein, the second connection identifier is the same as or different from the first connection identifier.

23. A communication node applied to an access identifier and location separation network, comprising at least one processor and a storage device for storing processor-executable instructions that when executed by the at least one processor cause the at least one processor to perform steps in an access unit and a message forwarding unit, wherein,
the access unit is configured to establish, for each accessed terminal, a binding relationship between a first identifier of the terminal and a transmitting-receiving link;
the message forwarding unit is configured to, when receiving a data message sent from the terminal on the transmitting-receiving link, if a source address of the data message is a second identifier of the terminal, convert the source address to the first identifier of the terminal according to the binding relationship and then send the data message to a backbone network for forwarding; and, when receiving a data message whose destination address is the first identifier of the terminal, convert the first identifier to the second identifier, and forward the converted data message to the terminal through the transmitting-receiving link corresponding to the first identifier according to the binding relationship;
wherein,
the first identifier is an access identifier of the terminal, and the second identifier is a private network IP address of the terminal, and the access identifier of the terminal is composed of the private network IP address of the terminal, and prefix/suffix information;
the message forwarding unit is configured to implement conversion between the first identifier and the second identifier by removing or adding the prefix/suffix information.

24. A communication node applied to an access identifier and location separation network, comprising at least one processor and a storage device for storing processor-executable instructions that when executed by the at least one processor cause the at least one processor to perform steps in a connection identifier distributing unit and an address converting unit, wherein,
the connection identifier distributing unit is configured to, when receiving a data message sent from an correspondent node to a terminal, distribute a connection identifier to the correspondent node of the terminal according to an access identifier of the correspondent node in a source address of the data message, and store a corresponding relationship between the connection identifier and the access identifier of the correspondent node;
the address converting unit is configured to replace the source address in the data message sent to the terminal with the connection identifier according to the corresponding relationship and then send the data message to the terminal; and, after receiving the data message using the connection identifier as a destination address from the terminal, replace the destination address in the data message with the access identifier of the correspondent node according to the corresponding relationship and then forward the data message to the correspondent node.

25. The communication node according to claim 24, wherein,
the communication node is an access service node in the access identifier and location separation network, or an intercommunication node for achieving intercommunication between the access identifier and location separation network and a legacy IP network.

26. The communication node according to claim 24, wherein,
the connection identifier distributing unit is configured to distribute the same or different connection identifiers to the correspondent nodes of different terminals.

* * * * *